(12) United States Patent
Iwakiri et al.

(10) Patent No.: US 8,267,760 B2
(45) Date of Patent: Sep. 18, 2012

(54) GAME DEVICE, GAME DEVICE CONTROL METHOD, AND INFORMATION STORAGE MEDIUM

(75) Inventors: Takeshi Iwakiri, Saitama (JP); Waichiro Ozaki, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 79 days.

(21) Appl. No.: 12/851,033

(22) Filed: Aug. 5, 2010

(65) Prior Publication Data

US 2011/0034249 A1 Feb. 10, 2011

(30) Foreign Application Priority Data

Aug. 7, 2009 (JP) ................................. 2009-185261

(51) Int. Cl.
*A63F 9/24* (2006.01)
*A63F 13/00* (2006.01)
(52) U.S. Cl. .......... 463/1; 463/4; 463/7; 463/36; 463/43
(58) Field of Classification Search .................. 463/1, 4, 463/7, 36, 43
See application file for complete search history.

(56) References Cited

U.S. PATENT DOCUMENTS

2004/0063479 A1* 4/2004 Kimura .............................. 463/4

FOREIGN PATENT DOCUMENTS

JP 2004-121397 A 4/2004

\* cited by examiner

*Primary Examiner* — Peter DungBa Vo
*Assistant Examiner* — Jasson Yoo
(74) *Attorney, Agent, or Firm* — Sughrue Mion, PLLC

(57) ABSTRACT

A final result determining section determines a final result of a related match which is carried out in parallel with at least a part of a main match in which a target instructed by a game player participates. A main match performing section carries out the main match. An interim result output control section causes an output section to output an interim result of the related match in a case where the main match is being carried out. An interim result determining section determines the interim result of the related match to be output in the case where the main match is being carried out, based on an interim result of the main match and the final result of the related match.

9 Claims, 8 Drawing Sheets

| MAIN MATCH INTERIM RESULT | RELATED MATCH INTERIM RESULT |
|---|---|
| p>q | 2-0 |
| p=q | ANY OF 1-0, 2-0, AND 2-1 |
| p<q | ANY OF 0-0, 1-1, 1-0, 2-0, AND 2-1 | p: GOALS SCORED BY PLAYER TEAM WHILE GAME IS IN PROGRESS
q: GOALS CONCEDED BY PLAYER TEAM WHILE GAME IS IN PROGRESS

| RANK | SOCCER TEAM | POINT | GOAL DIFFERENCE |
|---|---|---|---|
| 1 | TEAM A (PLAYER TEAM) | 30 | +12 |
| 2 | TEAM C | 29 | +15 |
| 3 | TEAM D | 25 | +11 |
| 4 | TEAM B | 21 | +9 |
| ... | ... | ... | ... |

FIG.6

| POINTS DIFFERENCE | RELATED MATCH FINAL RESULT | MAIN MATCH INTERIM RESULT | RELATED MATCH INTERIM RESULT INFORMATION |
|---|---|---|---|
| ... | ... | ... | ... |
| +1 | Ro>So | p>q | $r=Ro$<br>$s=0$ |
| | | p=q | $Rl \leqq r \leqq Ro$<br>$Sl \leqq s \leqq So$<br>$r>s$ |
| | | p<q | $Rl \leqq r \leqq Ro$<br>$Sl \leqq s \leqq So$<br>$r \geqq s$ |
| | Ro=So | p>q | $r=Ro$<br>$s=0$ |
| | | p=q | $Rl \leqq r \leqq Ro$<br>$Sl \leqq s \leqq So$<br>$r \geqq s$ |
| | | p<q | $Rl \leqq r \leqq Ro$<br>$Sl \leqq s \leqq So$<br>$r \geqq s$ |
| | Ro<So | ... | ... |
| ... | ... | ... | ... | p: GOALS SCORED BY PLAYER TEAM WHILE GAME IS IN PROGRESS
q: GOALS CONCEDED BY PLAYER TEAM WHILE GAME IS IN PROGRESS
r: GOALS SCORED BY RIVAL TEAM WHILE GAME IS IN PROGRESS
s: GOALS CONCEDED BY RIVAL TEAM WHILE GAME IS IN PROGRESS
Ro: GOALS SCORED BY RIVAL PLAYER TEAM WHEN GAME ENDS
So: GOALS CONCEDED BY RIVAL PLAYER TEAM WHEN GAME ENDS
Rl: GOALS SCORED BY RIVAL PLAYER TEAM AT PREVIOUS OUTPUT TIME
Sl: GOALS CONCEDED BY RIVAL PLAYER TEAM AT PREVIOUS OUTPUT TIME

FIG.7

| MAIN MATCH INTERIM RESULT | RELATED MATCH INTERIM RESULT |
|---|---|
| p>q | 2-0 |
| p=q | ANY OF 1-0, 2-0, AND 2-1 |
| p<q | ANY OF 0-0, 1-1, 1-0, 2-0, AND 2-1 | p: GOALS SCORED BY PLAYER TEAM WHILE GAME IS IN PROGRESS q: GOALS CONCEDED BY PLAYER TEAM WHILE GAME IS IN PROGRESS

FIG.9

| MAIN MATCH INTERIM RESULT | RELATED MATCH INTERIM RESULT |
|---|---|
| p>q | 0-0 |
| p=q | 0-0 |
| p<q | 0-0 | p: GOALS SCORED BY PLAYER TEAM WHILE GAME IS IN PROGRESS q: GOALS CONCEDED BY PLAYER TEAM WHILE GAME IS IN PROGRESS

GAME DEVICE, GAME DEVICE CONTROL METHOD, AND INFORMATION STORAGE MEDIUM

CROSS-REFERENCE TO RELATED APPLICATION

The present application claims priority from Japanese application JP2009-185261 filed on Aug. 7, 2009, the content of which is hereby incorporated by reference into this application.

BACKGROUND OF THE INVENTION

1. Field of the Invention

The present invention relates to a game device, a game device control method, and an information storage medium.

2. Description of the Related Art

There is known a game device which produces an effect, while a match (a main match) in which a target instructed (operated) by a game player participates is carried out, as if another match were also carried out in parallel with at least a part of the main match. In a game device described in, e.g., JP2004-121397A, the content of an event occurring in the other match is output during the main match.

SUMMARY OF THE INVENTION

When a match in which a target instructed (operated) by a game player participates is carried out in a game device, if the sense of urgency of the game player can be kept high, the game player can feel more satisfied.

The present invention has been conceived in view of the above, and aims to provide a game device, a game device control method, and an information storage medium which can cause a game player to keep a high sense of urgency.

In order to achieve the above described object, a game device according to the present invention is a game device comprising a final result determining section for determining a final result of a related match which is carried out in parallel with at least a part of a main match in which a target instructed by a game player participates; a main match performing section for carrying out the main match; an interim result output control section for causing an output section to output an interim result of the related match in a case where the main match is being carried out; and an interim result determining section for determining the interim result of the related match to be output in the case where the main match is being carried out, based on an interim result of the main match and the final result of the related match.

A control method according to the present invention is a control method for a game device, comprising a final result determining step of determining a final result of a related match which is carried out in parallel with at least a part of a main match in which a target instructed by a game player participates; a main match performing step of carrying out the main match; an interim result output control step of causing an output section to output an interim result of the related match in a case where the main match is being carried out; and an interim result determining step of determining the interim result of the related match to be output in the case where the main match is being carried out, based on an interim result of the main match and the final result of the related match.

A program according to the present invention is a program for causing a computer to function as a final result determining section for determining a final result of a related match which is carried out in parallel with at least a part of a main match in which a target instructed by a game player participates; a main match performing section for carrying out the main match; an interim result output control section for causing an output section to output an interim result of the related match in a case where the main match is being carried out; and an interim result determining section for determining the interim result of the related match to be output in the case where the main match is being carried out, based on an interim result of the main match and the final result of the related match.

An information storage medium according to the present invention is a computer readable information storage medium storing the above described program.

According to the present invention, it is possible to cause a game player to keep a high sense of urgency.

In an embodiment of the present invention, the interim result determining section may include a section for obtaining data correlating information relating to the interim result of the related match, and a condition relating to the interim result of the main match and the final result of the related match, and a section for determining the interim result of the related match to be output in the case where the main match is being carried out, based on the interim result of the main match, the final result of the related match, and the data.

In an embodiment of the present invention, the interim result determining section may determine the interim result of the related match to be output in the case where the main match is being carried out, based on a match result of the game player before the main match starts, the interim result of the main match, and the final result of the related match.

In an embodiment of the present invention, in a case of outputting a second interim result as the interim result of the related match after a first interim result is output as the interim result of the related match in the case where the main match is being carried out, the interim result determining section may determine the second interim result, based on the first interim result, the interim result of the main match, and the final result of the related match.

In an embodiment of the present invention, in the main match, a match between a character or character group corresponding to the game player and a character or character group corresponding to an opponent may be carried out, and the interim result output control section may include a section for determining whether or not states of the character or character group corresponding to the game player and of the character or character group corresponding to the opponent satisfy a predetermined condition, and a section for causing the output section to output the interim result of the related match in a case where the states of the character or character group corresponding to the game player and of the character or character group corresponding to the opponent satisfy the predetermined condition.

In an embodiment of the present invention, in the main match, a match of a sport using a moving object may be carried out, between a character or character group corresponding to the game player and a character or character group corresponding to an opponent. The interim result output control section may include a section for determining whether or not a state of the moving object is a predetermined state, and a section for causing the output section to output the interim result of the related match in a case where the state of the moving object is the predetermined state.

In an embodiment of the present invention, in the main match, in a case where a predetermined game event occurs, an image and sound corresponding to the game event may be reproduced. The interim result output control section may include a section for causing the output section to output a sound reporting the interim result of the related match in a case where reproduction of the sound is completed before reproduction of the image is completed, and a period of time longer than a predetermined period of time is left before the reproduction of the image is completed.

BRIEF DESCRIPTION OF THE DRAWINGS

FIG. 6 is a diagram showing one example of interim result data;

FIG. 7 is a diagram showing one example of an interim result of a related match;

FIG. 9 is a diagram showing another example of an interim result of a related match.

DETAILED DESCRIPTION OF THE INVENTION

In the following, one example of an embodiment of the present invention will be described in detail with reference to the accompanying drawings. A game device according to an embodiment of the present invention is realized using, e.g., a consumer game device (an installation type game device), a portable game device, a portable phone, a personal digital assistant (PDA), a personal computer, a server computer, or the like. In this specification, a case in which a game device according to an embodiment of the present invention is realized using a consumer game device will be described.

Figure 1:
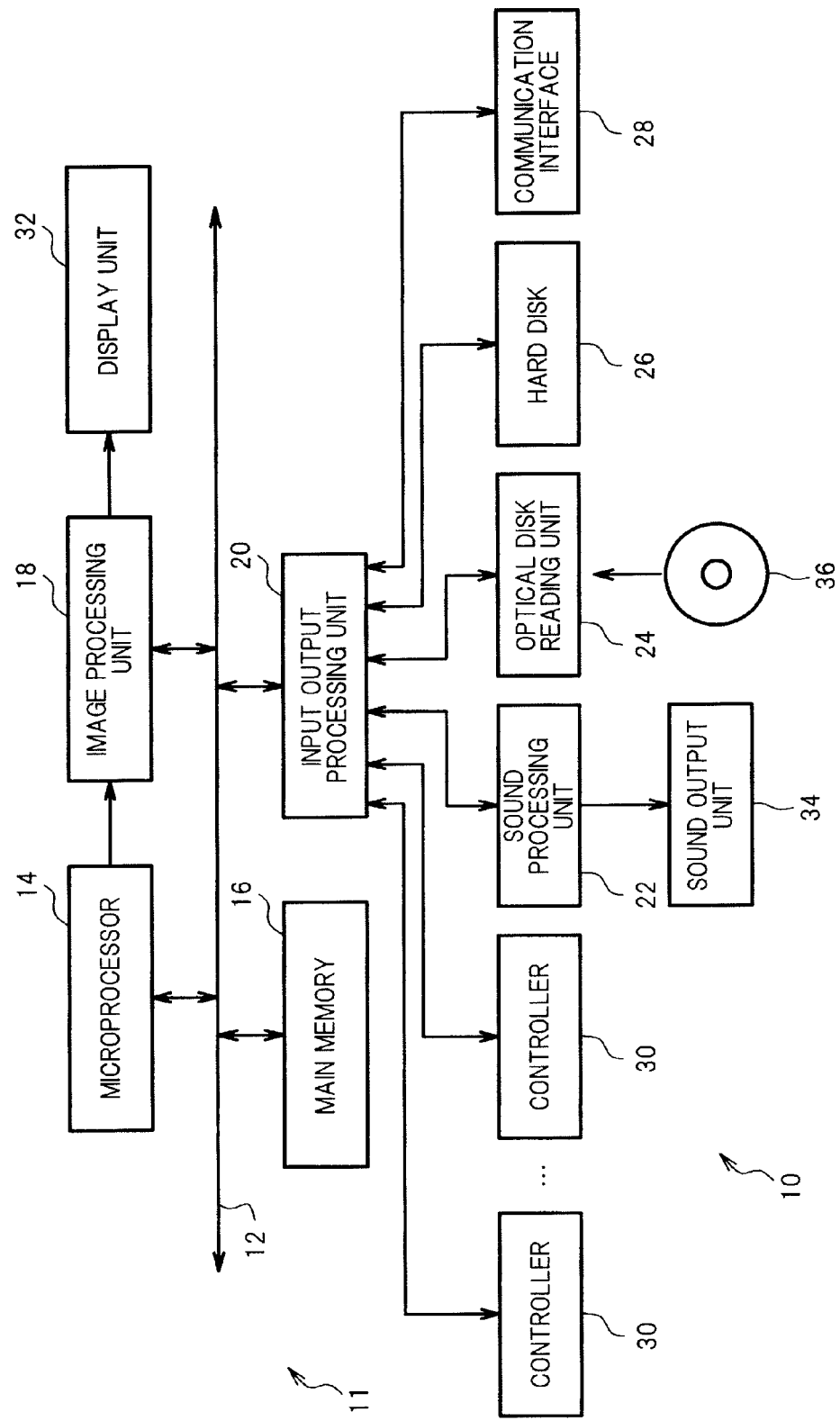
FIG. 1 is a diagram showing a hardware structure of a game device according to an embodiment of the present invention.

FIG. 1 is a diagram showing a hardware structure of a game device according to an embodiment of the present invention. The game device shown in FIG. 1 comprises a consumer game device 11, a display unit 32, a sound output unit 34, and an optical disk 36 (an information storage medium). The display unit 32 and the sound output unit 34 are connected to the consumer game device 11. As the display unit 32, e.g., a home-use television set receiver is used, and as the sound output unit 34, e.g., a speaker built in a home-use television set receiver is used.

The consumer game device 11 is a publicly known computer game system. The consumer game device 11 comprises a bus 12, a microprocessor 14, a main memory 16, an image processing unit 18, an input output processing unit 20, a sound processing unit 22, an optical disk reading unit 24, a hard disk 26, a communication interface 28, and a controller 30. Structural elements other than the controller 30 are accommodated in the enclosure of the consumer game device 11.

The microprocessor 14 carries out various information processes, based on an operating system stored in a ROM (not shown) and a program read from the optical disk 36. The main memory 16 includes, e.g., a RAM. A program and data read from the optical disk 36 is read into the main memory 16 when necessary. The main memory 16 is used as a working memory of the microprocessor 14. The bus 12 is used to exchange an address and data among the respective units of the consumer game device 11.

The image processing unit 18 includes a VRAM, and renders a game screen image into the VRAM, based on the image data sent from the microprocessor 14. A game screen image rendered in the VRAM is converted into a video signal, and output to the display unit 32 at a predetermined time.

The input output processing unit 20 is an interface via which the microprocessor 14 accesses the sound processing unit 22, the optical disk reading unit 24, the hard disk 26, the communication interface 28, and the controller 30. The sound processing unit 22 includes a sound buffer, and outputs various kinds of sound data read from the optical disk 36 into the sound buffer, via the sound output unit 34. The communication interface 28 is an interface for connecting the consumer game device 11 to a communication network such as the Internet or the like in either a wired or wireless manner.

The optical disk reading unit 24 reads a program and data recorded on the optical disk 36. Note that although the optical disk 36 is used here to supply a program and data to the consumer game device 11, any other information storage medium such as a memory card or the like may be used instead. Alternatively, a program and data may be supplied from a remote place to the consumer game device 11 via a communication network such as, e.g., the Internet or the like. The hard disk 26 is a typical hard disk device (an auxiliary memory device). Note that a program and data described here as being recorded on the optical disk 36 may be stored in the hard disk 26 instead.

The controller 30 is a general purpose operation means for receiving a game operation. For example, the controller 30 comprises a direction designation button, a plurality of operation sticks (operating levers), and a plurality of operation buttons. The input output processing unit 20 scans the states of the respective operation members of the controller 30 every constant cycle (e.g., every $1/60^{th}$ of a second), and sends an operation signal describing the scanned result to the microprocessor 14 via the bus 12. The microprocessor 14 determines a game operation carried out by a game player, based on the operation signal. Note that the consumer game device 11 is adapted to connection to a plurality of controllers 30 in either wired or wireless manner.

In the game device 10, a game program read from the optical disk 36 is executed so as to realize, e.g., a soccer game in which a soccer team instructed (operated) by a game player (hereinafter referred to as a "player team") participates in a league, with the aim of finishing highest in the league.

Figure 2:
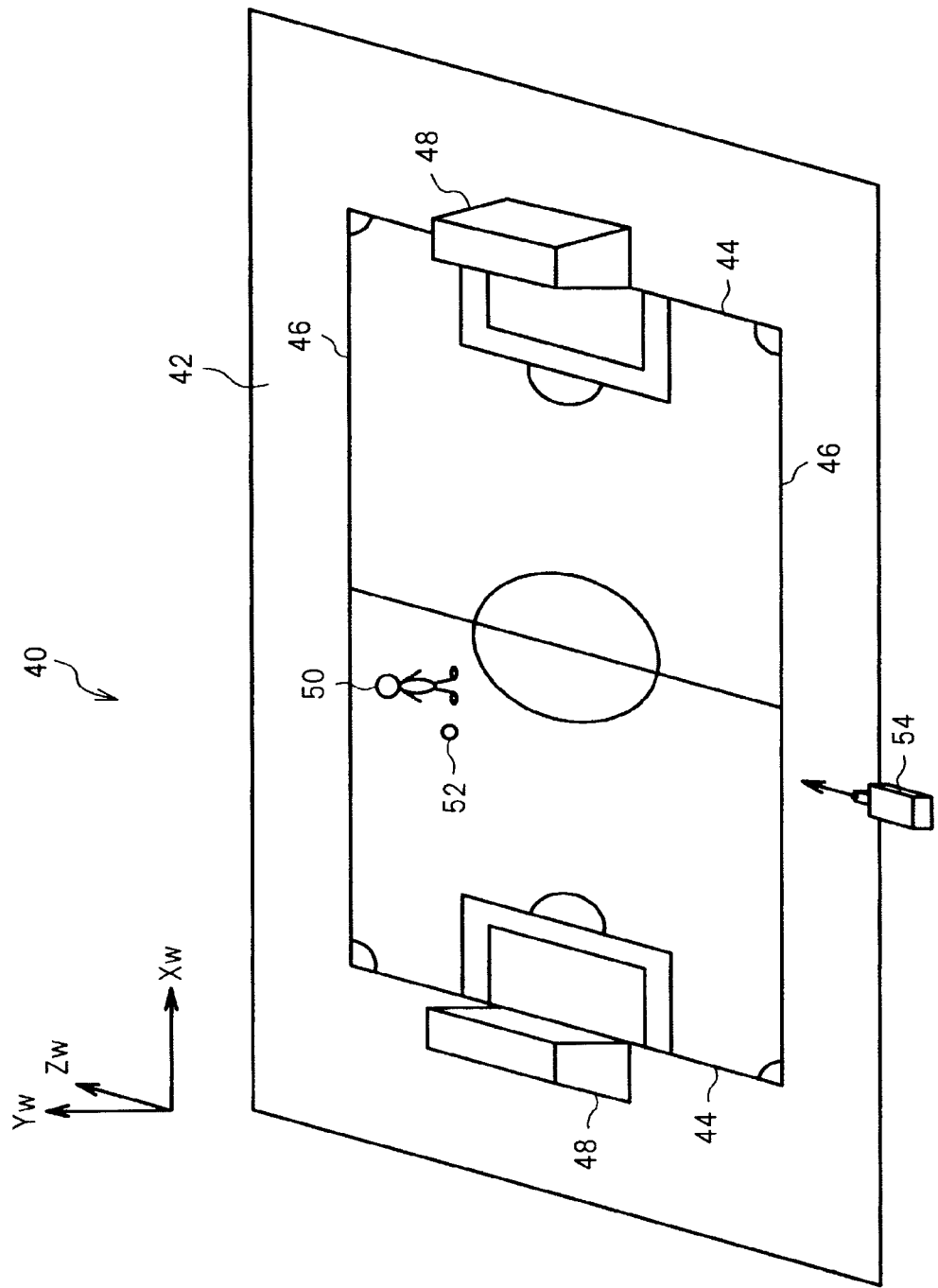
FIG. 2 is a diagram showing one example of a game space.

In the game device 10, a game space is created in the main memory 16 when a match between the player team and another soccer team participating in the league (hereinafter referred to as an "opponent team") is carried out. FIG. 2 shows one example of the game space. The game space 40 shown in FIG. 2 is a virtual three-dimensional space. As shown in FIG. 2, a field 42, or an object representing a soccer field, is placed in the game space 40, and goal lines 44 and touch lines 46 are drawn on the field 42.

In addition, a goal 48, or an object representing a soccer goal, a soccer player character 50, or an object representing a soccer player, a ball 52, or an object representing a soccer ball, are placed on the field 42. Although not shown in FIG. 2, eleven soccer player characters 50 belonging to the player team and eleven soccer player characters 50 belonging to the opponent team are also placed on the field 42.

One of the goals 48 is correlated to the player team, while the other is correlated to the opponent team. With the ball 52 having been moved into the inside the goal 48 correlated to one team, a score event occurs to the other team.

A virtual camera 54 (viewpoint) is set in the game space 40. A game screen image showing a picture obtained by viewing the game space 40 from the virtual camera 54 is displayed on the display unit 32. The virtual camera 54 moves in the game space 40, based on the position of the ball 52, so that, e.g., the ball 52 is always shown in a game screen image.

Figure 3:
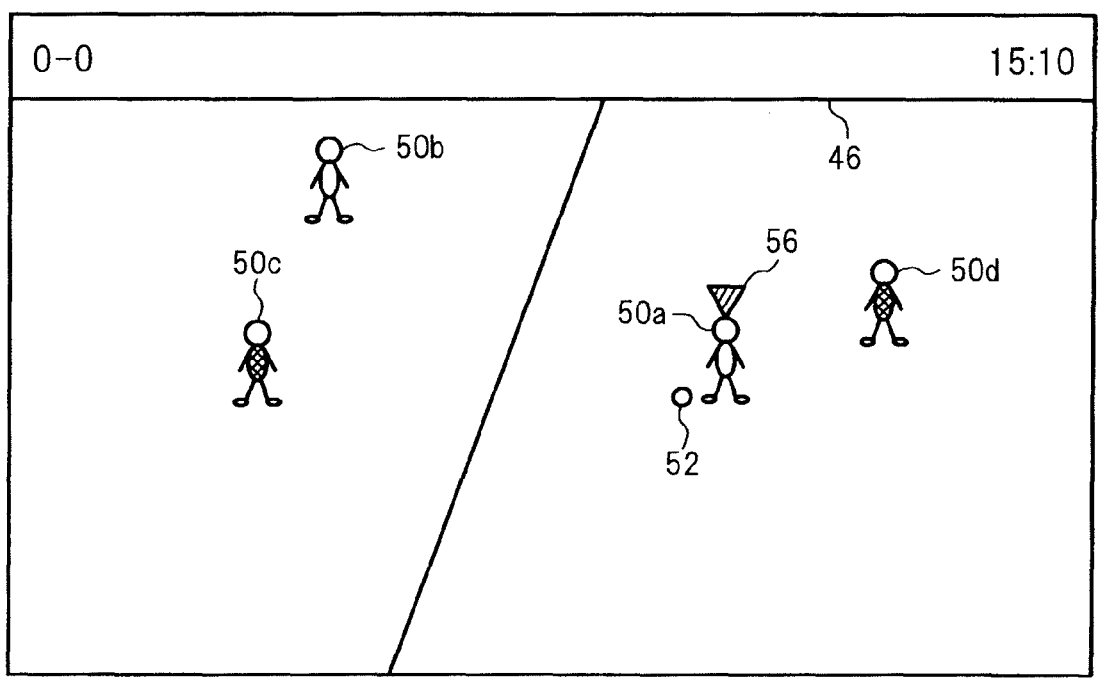
FIG. 3 is a diagram showing one example of a game screen image.

FIG. 3 shows one example of a game screen image. Soccer player characters 50a, 50b belonging to the player team and soccer player characters 50c, 50d belonging to the opponent team are shown in the game screen image shown in FIG. 3.

In addition, in the game screen image shown in FIG. 3, a triangular cursor 56 is shown above the head of the soccer player character 50a. While any of the soccer player characters 50 belonging to the player team is set as a target to be operated by a game player (an operation target) in this embodiment, the cursor 56 serves for guiding the soccer player character 50 which is set as the current operation target of a game player. That is, in the situation shown in FIG. 3, the soccer player character 50a is set as an operation target of a game player.

The soccer player character 50 set as an operation target of a game player acts according to an operation carried out by the game player. Soccer player characters 50 among those belonging to the player team, not set as an operation target of a game player, act according to AI (Artificial Intelligence). Soccer player characters 50 belonging to the opponent team also act according to AI.

In this soccer game, commentary sound reporting the current situation of a match (a main match) between the player team and the opponent team is output. For example, commentary sound such as, e.g., "soccer player Z shot!" or the like is output. Note that a commentary message may be shown in a game screen image.

In addition, in this soccer game, an effect is produced as if, during a match (a main match) between the player team and the opponent team, another match were carried out in parallel with at least a part of the main match. Specifically, an interim result of a match between other soccer teams participating in the league is output in a case where the main match is being carried out. For example, as shown in FIG. 3, a sound reporting an interim result of another match such as, e.g., "X is ahead of Y with 2-1 in a match between X and Y" is output. Note that a message reporting an interim result of another match may be shown in a game screen image.

In the following, a technique for allowing a game player to keep a high sense of urgency in a soccer game such as is described above will be described.

Figures 4, 5:
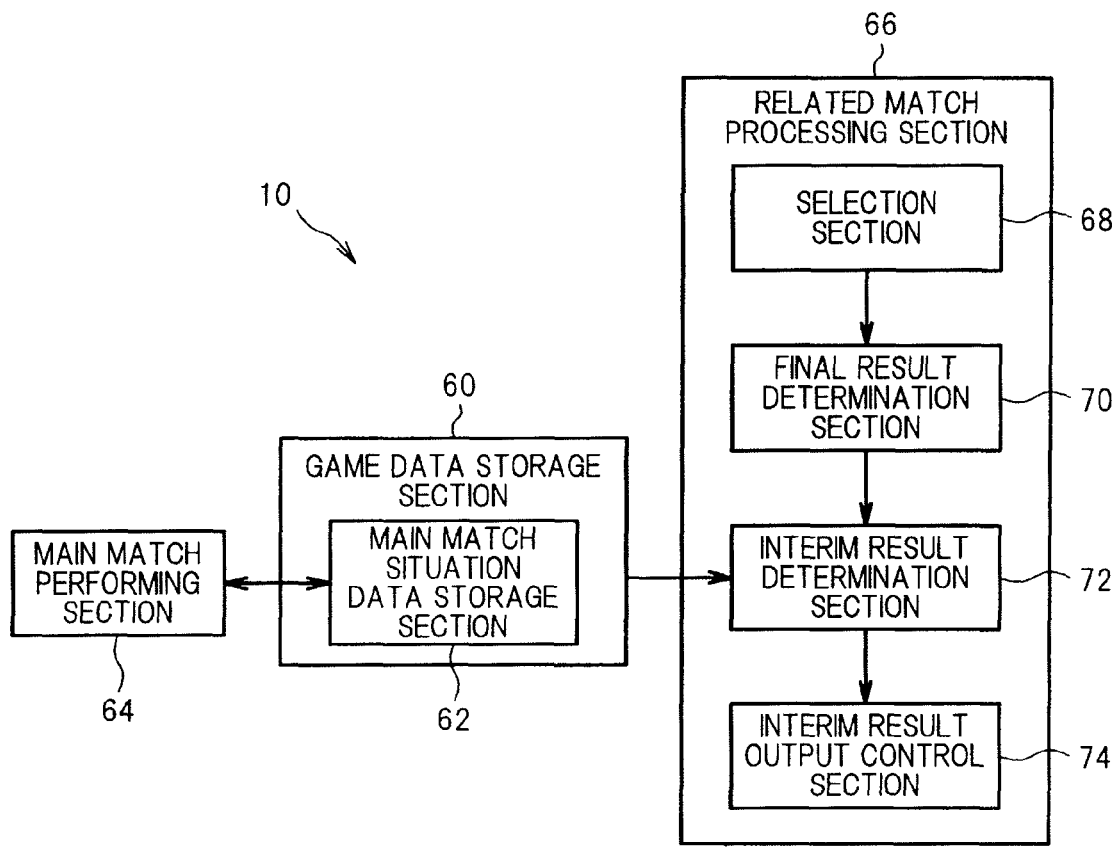
FIG. 4 is a functional block diagram of a game device according to the embodiment of the present invention.
FIG. 5 is a diagram showing one example of match result data.

FIG. 4 is a functional block diagram showing functions realized in the game device 10. As shown in FIG. 4, the game device 10 comprises a game data storage section 60, a main match performing section 64, and a related match processing section 66. The game data storage section 60 is realized using, e.g., the main memory 16 and the optical disk 36, while the other functional blocks are realized by the microprocessor 14 executing a program read form the optical disk 36.

The game data storage section 60 stores data relating to a soccer game. For example, the game data storage section 60 stores team data on the respective soccer teams participating in the league. For example, team data includes parameter data concerning the capability (attack capability, defense capability) of a soccer team and the abilities of respective soccer player characters belonging to the soccer team.

The game data storage section 60 stores match result data. FIG. 5 shows one example of match result data. In FIG. 5, the "points (points awarded for a win)" is a numeric value in accordance with a match result of a soccer team. That is, the points are increased by three for a win, and one for a draw. The "goal difference" refers to a difference between accumulated goals scored and accumulated goals conceded of a soccer team.

The game data storage section 60 includes a main match situation data storage section 62. The main match situation data storage section 62 stores main match situation data describing the current situation of a match (a main match) between the player team and the opponent team. For example, the main match situation data contains data such as is shown below:

(a) data describing the current state of each soccer player character 50;

(b) data describing the current state (e.g., position, moving direction, moving speed, and so forth) of the ball 52;

(c) data describing the current state (e.g., position, viewing direction, and so forth) of the virtual camera 54;

(d) data describing the goals scored by the respective teams; and (e) data describing an elapsed period of time.

Note that data describing the current state of a soccer player character 50 contains data describing, e.g., the position, orientation (posture), action type, moving direction, moving speed, and so forth of the soccer player character 50. In addition, data describing the current state of a soccer player character 50 further contains data indicating whether or not the soccer player character 50 is set as an operation target of a game player and data indicating whether or not the soccer player character 50 is in possession of the ball 52.

The main match performing section 64 carries out a match (a main match) between the player team and the opponent team. For example, the main match performing section 64 updates the main match situation data stored in the main match situation data storage section 62, based on an operation carried out by a game player. In addition, e.g., the main match performing section 64 produces a game screen image, based on the main match situation data stored in the main match situation data storage section 62, and causes the display unit 32 to display the game screen image. Details of an operation of the main match performing section 64 will be described later (see S103, S104, S109 in FIG. 8).

The related match processing section 66 carries out a process relating to a match (a related match) related to the main match. The related match processing section 66 comprises a selection section 68, a final result determination section 70, an interim result determination section 72, and an interim result output control section 74.

The selection section 68 selects, as a related match, at least one of the matches other than the main match (that is, a match between soccer teams other than the player team). For example, the selection section 68 selects as a rival team at least one of the soccer teams other than the player team, and selects as a related match a match between the rival team and another soccer team.

For example, a rival team is selected based on the match result of the player team. For example, a soccer team close in rank to the player team may be selected as a rival team. In the example shown in, e.g., FIG. 5, in which the player team (team A) ranks first, the team C, ranked second, is selected as a rival team.

Note that in the case in which a soccer team in a final rank equal to or higher than a reference rank in the first league remains in the first league, while a soccer team in a final rank lower than the reference rank is demoted to the second league which is inferior to the first league, a soccer team competing with the player team to remain in the first league may be selected as a rival team.

The final result determination section 70 determines the final result of a related match. For example, the final result determination section 70 determines win/lose/draw of a related match and goals scored by the respective soccer teams (that is, goals scored by the respective soccer teams at the end of the related match). Note that the final result determination section 70 determines the final result of a related match before the main match starts.

For example, the final result determination section 70 simulates a related match, based on the team data on the respective soccer teams involved in the related match. For example, the simulation is a rough one in which win/lose/draw of a related team and goals scored of the respective soccer teams when the related match ends are determined based on a parameter concerning, e.g., attack capability, defense capability, and so forth of the respective soccer teams.

Alternatively, the simulation may be a precise one in which respective soccer player characters 50 belonging to the respective soccer teams are made to actually act according to AI in the game space 40 to determine win/lose/draw of the related team and goals scored by the respective soccer teams (that is, goals scored by the respective soccer teams at the end of the related match).

The interim result output control section 74 causes an output section to output an interim result of a related match in a case where the main match is being carried out. Note that an "output section" includes, e.g., the display unit 32 or the sound output unit 34. An interim result of a related match to be output by the interim result output control section 74 is determined by the interim result determination section 72, details of which will be described later.

For example, the interim result output control section 74 determines, during the main match, whether or not a time to output an interim result of a related match has arrived. In this embodiment, arrival of an output time for an interim result of a related match is determined when the need to output commentary on the main match is low.

For example, a case with a low need to output commentary on the main mach may include a case in which, e.g., a situation without an action which should be commented of a soccer player character 50 belonging to either the player team or the opponent team has continued longer than a predetermined period of time. In addition, for example, a case in which the ball 52 has moved over the touch line 46 and such does not particularly need to be commented on is also regarded as a case with a low need to output commentary on the main match.

Whether or not a situation without an action which should be commented about, by a soccer player character 50 belonging to either the player team or the opponent team, has continued longer than the predetermined period of time is determined by determining whether or not the states of the soccer player characters 50 and/or the ball 52 satisfy a predetermined condition. Therefore, the interim result output control section 74 determines whether or not the states of the soccer player characters 50 and/or the ball 52 satisfy the predetermined condition. For a case in which the states of the soccer player characters 50 and/or the ball 52 satisfy the predetermined condition, the interim result output control section 74 determines that a time to output an interim result of a related match has arrived, and causes the output section to output an interim result of the related match.

Whether or not it is a situation in which the ball 52 has moved over the touch line 46 and so does not particularly need to be commented is determined by determining whether or not the state of the ball 52 has come to be a predetermined state. Therefore, the interim result output control section 74 determines whether or not the state of the ball 52 is the predetermined state. With the state of the ball 52 being the predetermined state, the interim result output control section 74 determines that a time to output an interim result of a related match has arrived, and causes the output section to output an interim result of the related match.

As described above, an interim result of a related match is output when the need to output commentary on the main match is low in this embodiment. As a result, an interim result of a related match is output while ensuring output of commentary on the main match is not hindered.

In a soccer game, in a case where a specific game event (e.g., a soccer player exchange event, a score event, a shoot event, or the like) occurs, an image (moving image) and sound for the game event are reproduced. In a case in which reproduction of the sound is completed earlier than reproduction of the image and a period of time longer than a predetermined period of time is still left before the reproduction of the image is completed, there is a sufficient period of time left to output an interim result of a related match. Therefore, in such a case as well, it may be determined that a time to output an interim result of a related match has arrived.

In this manner as well, an interim result of a related match can be output while ensuring output of other sound or the like is not hindered.

The interim result determination section 72 determines an interim result of a related match to be output in a case where the main match is being carried out, based on an interim result of the main match and the final result of the related match. In this embodiment, the interim result determination section 72 determines an interim result of a related match to be output in a case where the main match is being carried out, based on the match results of the player team and the rival team before the main match and the related match start, an interim result of the main match, and the final result of the related match.

In this embodiment, data (interim result data) for use as a basis in determining an interim result of a related match is stored in the game data storage section 60. The interim result determination section 72 determines an interim result of a related match, based on the interim result data. FIG. 6 is a diagram showing one example of interim result data. The interim result data shown in FIG. 6 includes "points difference", "related match final result", "main match interim result", and "related match interim result information" fields.

The "points difference" field is related to a condition relating to the match results of the player team and a rival team before the main match and the related match start. Specifically, the "points difference" field indicates a condition relating to a numeric value obtained by subtracting the points of a rival team before the related match starts from the points of the player team before the main match starts.

The "related match final result" field is related to a condition relating to the final result of a related match. Specifically, the "related match final result" field indicates a condition relating to the goals scored (Ro) and the goals conceded (So) by a rival team when the related match ends. Note that the goals scored (Ro) and the goals conceded (So) by a rival team when the related match ends are determined in advance by the final result determination section 70, as described above.

The "main match interim result" field is related to a condition relating to the interim result of the main match. Specifically, the "main match interim result" field indicates a condition relating to the goals scored (p) and the goals conceded (q) by the player team while the main match is ongoing. The goals scored (p) and the goals conceded (q) by the player team while the main match is ongoing are obtained based on the main match situation data.

The "related match interim result information" field is related to information relating to the interim result of a related match. Specifically, the "related match interim result information" field indicates a condition to be satisfied by the goals scored (r) and the goals conceded (s) by a rival team while the related match is ongoing, and the interim result of the related match is determined so as to satisfy the condition. Note that "Rl", "Sl" in FIG. 6 respectively refer to the goals scored (r) and the goals conceded (s) by a rival team, having been output at a previous output time for an interim result of a related match. Note that "0" is set for "Rl" and "Sl" as an initial value.

Note that the "related match interim result information" field is set such that a result consistent to the final result determined by the final result determination section 70 is determined as an interim result. Further, the "related match interim result information" field is set such that a game player informed of an interim result of a related match can keep a high sense of urgency.

Here, assume a case in which an interim result of a related match is to be output for the first time in a case where the points difference between the player team and the rival team before the main match and the related match start is "+1" and the final result of the related match is determined such that "the rival team wins by a score of 2-1". That is, assume a case in which the goals scored (Ro) and goals conceded (So) by a rival team when the related match ends are two and one, respectively, and the values of the Rl and Sl are the initial values (0).

In this case, according to the interim result data shown in FIG. 6, the interim result of the related match is determined as shown in FIG. 7. Note that, e.g., "2-0" in FIG. 7 means that the goals scored (r) and goals conceded (s) by a rival team are two and zero, respectively.

As shown in FIG. 7, when the player team is ahead, that is, when the goals scored (p) by the player team are larger than the goals conceded (q) by the player team, the interim result of the related match is determined as "2-0". That is, an interim result that the rival team is ahead by "2-0" is determined.

It should be noted here that a rival team is awarded three points for a win. As the points difference before the main match and the related match start is "+1", the points of the rival team will exceed that of the player team if the rival team wins, unless the player team also wins. As a result, the player team will be ranked lower than the rival team.

If the interim result that the rival team is ahead by "2-0" is output as described above, a game player realizes that the rival team is highly likely to win and that the player team is highly likely to be ranked lower than the rival team unless the player team wins. That is, it is possible to have the game player feel urged to win at all costs. That is, it is possible to have the game player keep a high sense of urgency.

In a case where the player team and the opponent team have the same goals scored, as shown in FIG. 7, that is, in a case where the goals scored (p) by the player team are equal to the goals conceded (q) by the player team, the interim result of the related match is determined as either "1-0", "2-0", or "2-1". In this case, if the interim result of the related match is output, a game player realizes that the player team will be ranked lower than the rival team if the matches (the main match and the related match) end this way. As a result, the game player firmly realizes the need to do something to avoid such an outcome. That is, it is possible to have the game player keep a high sense of urgency.

Here, assume a case in which an interim result of a related match is output as "2-0" in a situation where the player team and the opponent team have the same goals scored, and further, a subsequent interim result output time arrives while the goals scored by the player team and those by the opponent team remain the same. In this case, if an interim result of the related match is output as "1-0", contradiction to the previously output interim result is caused, namely "2-0".

Regarding this point, the interim result determination section 72 determines an interim result of a related match, based also on the interim result output at the previous output time. That is, conditions such as "Rl≦r≦Ro" and "Sl≦s≦So" are held in the "related match interim result information" field of the interim result data shown in FIG. 6 so as to ensure that the goals scored (r) by a rival team are resultantly equal to or larger than the goals scored (Rl) by the rival team output at the previously output time. Similarly, the goals conceded (s) by a rival team are ensured to be equal to or larger than the goals conceded (Sl) by the rival team output at the previously output time.

With this arrangement, the interim result of a related match is determined consistent to the previously output interim result. For example, in a case in which "2-0" is previously output as an interim result, as described above, as the previously output goals scored (Rl) and goals conceded (Sl) by the rival team are two and zero, respectively, either of "2-0" and "2-1", rather than "1-0", is determined as an interim result of the related match.

Figure 8:
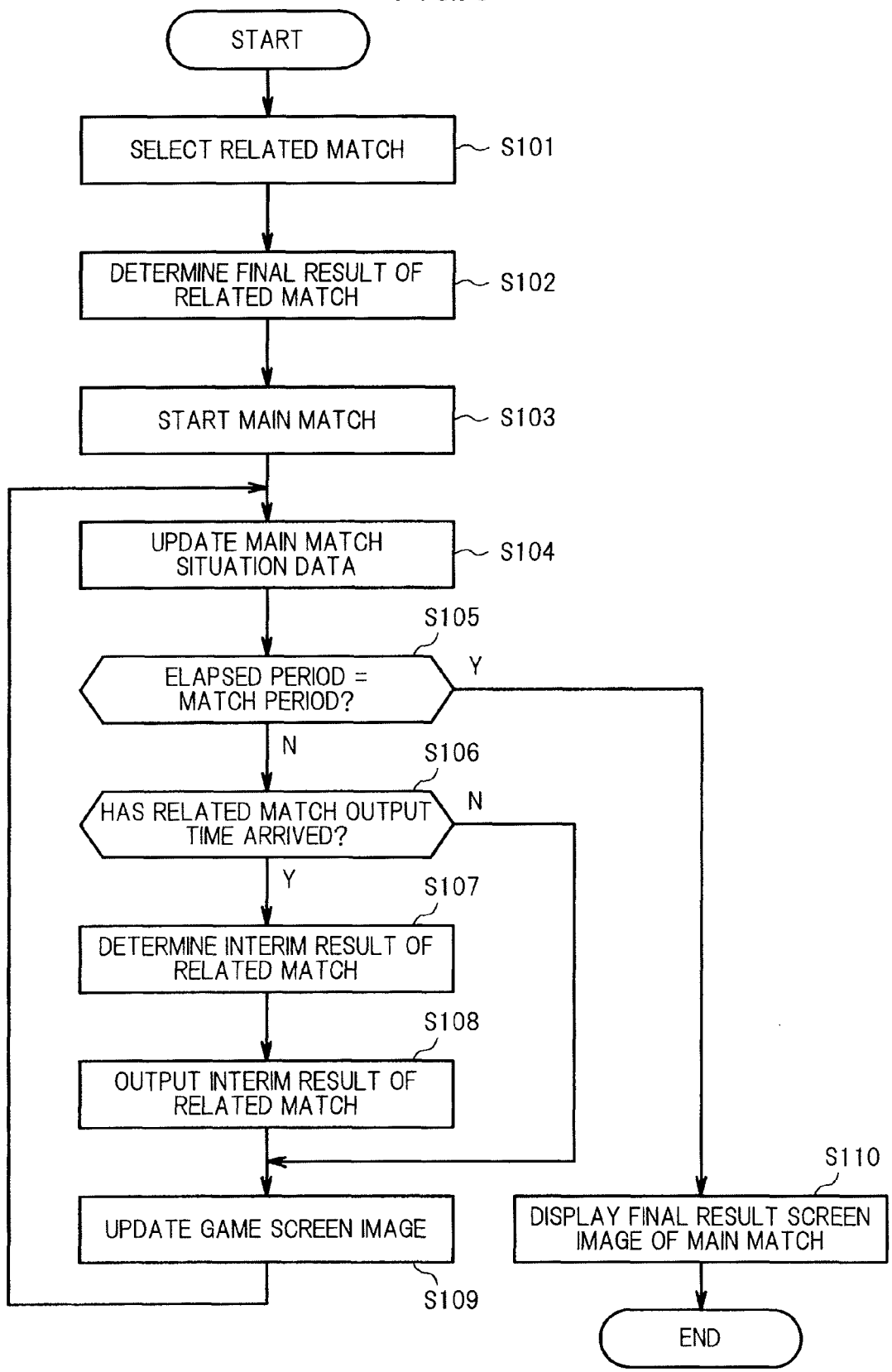
FIG. 8 is a flowchart of one example of a process to be carried out in the game device.

In the following, a process to be carried out in the game device 10 will be described. FIG. 8 is a flowchart of a process to be carried out in the game device 10 every predetermined period of time (e.g., 1/60$^{th}$ of a second). That is, the microprocessor 14 carries out the process shown in FIG. 8 according to a program read from the optical disk 36. With the process shown in FIG. 8 being carried out by the microprocessor 14, the main match performing section 64 and the related match processing section 66 are realized.

As shown in FIG. 8, initially, the microprocessor 14 (the selection section 68) selects a related match (S101). At S101, a rival team is selected based on the current match results (e.g., points awarded for a win) of the respective soccer teams. For example, a soccer team having a points difference (Δw) from the player team that satisfies −3<Δw<+3 is selected as a rival team. Then, a match between the rival team and another soccer team is selected as a related match.

Thereafter, the microprocessor 14 (the final result determination section 70) determines the final result of the related match (S102). At S102, the final result of the related match is determined by simulating the related match, based on the team data of the respective soccer teams involved in the related match.

Thereafter, the microprocessor 14 (the main match performing section 64) starts the main match (S103). That is, a match between the player team and the opponent team starts. With the main match having started, the microprocessor 14 repetitively carries out the processes at S104 to S109 every predetermined period of time (e.g., 1/60$^{th}$ of a second).

Initially, the microprocessor 14 (the main match performing section 64) updates the main match situation data (S104). At S104, e.g., the state (position, posture, and so forth) of the soccer player character 50 set as an operation target of a game player is updated based on an operation carried out by the game player. In addition, the states of the other soccer player characters 50 are updated according to AI. Further, the states of, e.g., the ball 52 and the virtual camera 54 are updated. Still further, the elapsed period of time after the main match starts is also updated.

Further, at S104, if the ball 52 is moved into the goal 48 correlated to either one of the soccer teams, the goals scored by the other soccer team are increased by one (in other words, the goals conceded by the one team are increased by one).

Thereafter, the microprocessor 14 (the main match performing section 64) determines whether or not the elapsed period of time has reached a match period (S105). A match period refers to a period equal to the time obtained by adding a predetermined base period and an additional period (a so-called lost time) determined depending on the match situation.

If the elapsed period of time has not reached the match period yet, the microprocessor 14 (the interim result output control section 74) determines whether or not a time to output an interim result of the related match has arrived (S106). For example, the microprocessor 14 determines whether or not the states of the soccer player characters 50 and/or the ball 52 satisfy a predetermined condition to thereby determine whether or not the need to output commentary on the main match is low.

If the states of the soccer player characters 50 and/or the ball 52 satisfy the predetermined condition, that is, if the need to output commentary on the main match is low, the microprocessor 14 (the interim result output control section 74) determines that a time to output an interim result of the related match has arrived. In this case, the microprocessor 14 (the interim result determination section 72) determines an interim result of the related match (S107).

At S107, initially, a points difference between the player team and the rival team before the main match and the related match start is obtained. Thereafter, interim result data (see FIG. 6) is read, and interim result information for the related match, corresponding to the combination among the points difference obtained, the final result of the related match determined at S102, and the current interim result of the main match retained in the main match situation data is obtained. Then, an interim result of the related match is determined based on the condition described by the interim result information obtained. That is, the goals scored (s) and goals conceded (r) by the rival team which satisfy the condition described by the interim result information obtained are determined as an interim result.

Thereafter, the microprocessor 14 (the interim result output control section 74) causes the output section to output the interim result of the related match (S108). For example, the microprocessor 14 causes the sound output unit 34 to output a sound corresponding to the interim result of the related match determined at S107. Also, for example, the microprocessor 14 may cause the display unit 32 to display a message indicating the interim result of the related match determined at S107.

With the processes completed at S106 to S108, the microprocessor 14 (the main match performing section 64) updates the game screen image (S109). That is, a game screen image showing a picture obtained by viewing the game space 40 from the virtual camera 54 is created in the VRAM, and the game screen image created in the VRAM is displayed on the display unit 32.

If it is determined at S105 that the elapsed period of time has reached the match period, the microprocessor 14 (the main match performing section 64) ends the main match, and displays a final result screen image of the main match (S110). The final result of the main match is shown in the final result screen image of the main match.

Note that at S110, the match result data (see FIG. 5) is updated based on the final results of the main match and the related match. Further, simulation is carried out for one or more matches other than the main match and the related match to determine the match result, and the match result data (see FIG. 5) is updated based on the match result.

In the above described game device 10, an effect is produced as if a match (a related match) between a rival team and another soccer team were carried out in parallel with at least a part of the match (the main match) between the player team and another soccer team. Specifically, an interim result of the related match is output during the main match.

In the game device 10, in particular, an interim result of a related match is determined based on an interim result of the main match. According to the game device 10, it is possible to determine an interim result of a related match in consideration of an interim result of the main match such that a game player can keep a high sense of urgency. In other words, according to the game device 10, it is possible to have a game player keep a high sense of urgency.

Note that the present invention is not limited to the above-described embodiment.

(1) Although it is described in the above that determination by the interim result determination section 72 is made in a case where a time to output an interim result of a related match arrives (see S106, S107 in FIG. 8), determination by the interim result determination section 72 may be made in a case where any change occurs to the interim result of the main match.

Specifically, determination by the interim result determination section 72 may be made when the situation of the main match is changed from any one to another of the situations including (a) one in which the goals scored by the player team are equal to those of the opponent team, (b) one in which the player team is ahead, and (c) one in which the player team is behind.

According to this aspect, the interim result determined in advance by the interim result determination section 72 is output in a case where a time to output an interim result of the related match arrives.

(2) Assume a case in which, e.g., the points difference between the player team and a rival team before the main match and the related match start is "+1" and the final result of the related match is such that "the rival team draws 0-0".

In this case, according to the interim result data shown in FIG. 6, the interim result of the related match is determined as shown in FIG. 9. That is, irrespective of an interim result of the main match, the interim result of the related match is determined as "0-0". In such a case, if the goals scored (p) by the player team are larger than the goals conceded (q) by the player team, that is, if the player team is ahead, the interim result output control section 74 may output not only a sound reporting the interim result of the related match but also a sound reporting that the rival team is dominant.

Note that a "sound reporting that the rival team is dominant" may include, e.g., the sounds described below. That is, with the sound mentioned below being output, a game player can keep a high sense of urgency.

a sound reporting that a larger number of shots are made by the rival team than by the opponent;

a sound reporting that the rival team has had a larger number of chances to shoot than to the opponent;

a sound reporting that the ball possession rate of the rival team is higher than that of the opponent;

a sound reporting that the rival team is managing to suppress the number of shots by the opponent to zero.

(3) For example, if a soccer player character 50 belonging to the player team (the soccer player character X here) and a soccer player character 50 belonging to another soccer team (the soccer player character Y here) are competing for an individual title (e.g., leading scorer, most assists, and so forth), the soccer team to which the soccer player character Y belongs may be selected as a rival team.

(4) For example, the soccer game may be one in which the player team participates in a tournament with the aim of winning the cup in the tournament. In this case, if, e.g., the player team participates in one of the semi-finals, the other semi-final is set as a related match.

(5) For example, the soccer game may be one in which a game player concentrates on playing the role of a coach.

(6) For example, the present invention is applicable to a sport game other than a soccer game. For example, the present invention is applicable to a game in which a character or a character group competes with another character or another character group, using a moving object (a ball, a puck, or the like). More specifically, the present invention is applicable to a basket ball game, an ice hockey game, an American football game, a baseball game, a tennis game, a table tennis game, or the like. Further, the present invention is applicable to a game other than a sport game.

(7) For example, the game space may be a two dimensional game space in which the positions or the like of a soccer player character and the ball are managed using two coordinate elements.

(8) While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device, comprising:
a match performing section for carrying out a first match in which a game player participates in the first match by instructing a target;
a final result determining section for determining a final score of a second match, the second match being carried out in parallel with at least a part of the first match;
an interim result determining section for determining an interim score corresponding to the second match after the final score of the second match is determined, wherein the determination of the interim score corresponding to the second match is based on both an interim score of the first match and the final score of the second match; and
an interim result output control section for causing an output section to output the interim score of the second match while the first match is being carried out.

2. The game device according to claim 1, wherein the interim result determining section includes
a section for obtaining data correlating information relating to the interim score of the second match, and a condition relating to the interim score of the first match and the final score of the second match, and a section for determining the interim score of the second match to be output in the case where the first match is being carried out, based on the interim score of the first match, the final score of the second match, and the data.

3. The game device according to claim 1, wherein the interim result determining section determines the interim score of the second match to be output in the case where the first match is being carried out, based on a previous match result history of the game player before the first match starts, the interim score of the first match, and the final score of the second match.

4. The game device according to claim 1, wherein, outputting the interim score comprises outputting a first interim score and a second interim score; and
in a case of outputting a second interim score as the interim score of the second match after a first interim score is output as the interim score of the second match in the case where the first match is being carried out, the interim result determining section determines the second interim score, based on the first interim score, the interim score of the first match, and the final score of the second match.

5. The game device according to claim 1, wherein
in the first match, a match between a character or character group corresponding to the game player and a character or character group corresponding to an opponent is carried out, and
the interim result output control section includes
a section for determining whether or not states of the character or character group corresponding to the game player and of the character or character group corresponding to the opponent satisfy a condition relating to a situation without an action that should be commented of the character or character group corresponding to the game player and the opponent, and
a section for causing the output section to output the interim score of the second match in a case where the states of the character or character group corresponding to the game player and of the character or character group corresponding to the opponent satisfy the condition.

6. The game device according to claim 1, wherein
in the first match, a match of a sport using a moving object is carried out, between a character or character group corresponding to the game player and a character or character group corresponding to an opponent, and
the interim result output control section includes
a section for determining whether or not a state of the moving object is a predetermined state, and
a section for causing the output section to output the interim score of the second match in a case where the state of the moving object is the predetermined state.

7. The game device according to claim 1, wherein
when a predetermined game event occurs in the first match, outputting an image and sound corresponding to the game event, and
the interim result output control section includes a section for outputting a sound of the interim score of the second match when the output of sound of the first match is completed before the output of the image of the first match is completed and when a time remaining for completion of the output of the image is longer than a predetermined period of time.

8. A control method for a game device, comprising:
carrying out a first match in which a game player participates in the first match by instructing a target;
determining a final score of a second match, the second match being carried out in parallel with at least a part of the first match;
determining, by one or more processor, an interim score corresponding to the second match after the final score of the second match is determined, and wherein the determination of the interim second corresponding to the second match is based on both an interim score of the first match and the final score of the second match; and
causing an output section to output an interim score of the second match while the first match is being carried out.

9. A non-transitory computer readable information storage medium storing a program for causing a computer to perform a method comprising:

carrying out a first match in which a game player participates in the first match by instructing a target;

determining a final score of a second match which is carried out in parallel with at least a part of the first match;

determining, an interim score corresponding to the second match after the final score of the second match is determined, and wherein the determination of the interim score corresponding to the second match is based on both an interim score of the first match and the final score of the second match; and causing an output section to output the interim score of the second match in a case where the first match is being carried out.

* * * * *